(12) United States Patent
Fowkes et al.

(10) Patent No.: US 9,927,077 B1
(45) Date of Patent: Mar. 27, 2018

(54) COMBINED FLASHLIGHT AND LANTERN

(71) Applicants: Infomercials, Inc., Springville, UT (US); Hydra Light International Pty. Ltd., Melbourne (AU)

(72) Inventors: Douglas Fowkes, Springville, UT (US); Arianne Rose Nuevo Pasagui, San Pablo (PH)

(73) Assignees: Infomercials, Inc., Springville, UT (US); Hydra Light International Pty. Ltd., Melbourne (AU)

( * ) Notice: Subject to any disclaimer, the term of this patent is extended or adjusted under 35 U.S.C. 154(b) by 0 days.

(21) Appl. No.: 15/720,645

(22) Filed: Sep. 29, 2017

Related U.S. Application Data

(63) Continuation of application No. 15/467,408, filed on Mar. 23, 2017.

(Continued)

(51) Int. Cl.
| | |
|---|---|
| *F21L 4/04* | (2006.01) |
| *H01M 6/34* | (2006.01) |
| *H01M 12/06* | (2006.01) |
| *F21V 17/02* | (2006.01) |
| *F21V 23/04* | (2006.01) |
| *F21V 31/00* | (2006.01) |
| *F21V 7/04* | (2006.01) |
| *F21V 3/00* | (2015.01) |
| *F21V 5/04* | (2006.01) |

(52) U.S. Cl.
CPC ............. *F21L 4/045* (2013.01); *F21V 3/00* (2013.01); *F21V 5/04* (2013.01); *F21V 7/04* (2013.01); *F21V 17/02* (2013.01); *F21V 23/0428* (2013.01); *F21V 31/005* (2013.01); *H01M 6/34* (2013.01); *H01M 12/06* (2013.01); *H01M 2220/30* (2013.01)

(58) Field of Classification Search
CPC .......... F21V 7/04; F21V 7/0025; F21V 17/02; F21L 4/04; F21L 4/045
USPC .................................................. 362/197, 198
See application file for complete search history.

(56) References Cited

U.S. PATENT DOCUMENTS

| | | | | |
|---|---|---|---|---|
| 1,248,688 | A * | 12/1917 | Ludescher | ............. F21L 4/005 362/186 |
| 1,904,248 | A * | 4/1933 | Bender | .................... F21L 4/00 362/186 |

(Continued)

OTHER PUBLICATIONS

UCO "UCO Clarus Led Lantern + Flashlight", http://ucogear.com/clarus-led-latern.html Accessed on this date: Feb. 10, 2017.

*Primary Examiner* — Julie Bannan
(74) *Attorney, Agent, or Firm* — Thorpe, North & Western, LLP

(57) ABSTRACT

A combined flashlight and lantern can have a light powered by a metal-air fuel cell that runs, or is activated, by water or an electrolyte such as salt water. The combined flashlight and lantern has both flashlight and lantern configurations. In the flashlight configuration, a head with a distal concave reflector is disposed towards a handle with the light in an aperture of the distal concave reflector to direct light axially. The distal concave reflector is opaque to resist light from emitting laterally therefrom. In the lantern configuration, the head with a distal convex reflector is disposed away from the handle and opposing a proximal convex reflector to direct light radially.

20 Claims, 10 Drawing Sheets

Related U.S. Application Data

(60) Provisional application No. 62/432,368, filed on Dec. 9, 2016.

(56) References Cited

U.S. PATENT DOCUMENTS

| | | | |
|---|---|---|---|
| 1,969,320 A | 8/1934 | Officer et al. | |
| 2,344,221 A * | 3/1944 | Trautner | B60Q 1/2611 362/297 |
| 2,441,986 A * | 5/1948 | Baughn | F21V 7/04 362/227 |
| 4,628,420 A | 12/1986 | McArthur | |
| 5,001,612 A * | 3/1991 | Odlum | F21L 15/02 362/186 |
| D335,192 S | 4/1993 | Abel | |
| 5,335,157 A * | 8/1994 | Lyons | B60Q 1/2611 362/297 |
| 5,963,009 A | 10/1999 | Brotherson | |
| D445,521 S | 7/2001 | Israel et al. | |
| D483,136 S | 12/2003 | Poon | |
| 7,097,323 B2 | 8/2006 | Puckett | |
| 7,241,025 B2 | 7/2007 | Kim | |
| D548,861 S | 8/2007 | Chapman | |
| D549,376 S | 8/2007 | Shiu | |
| D553,272 S | 10/2007 | Leung | |
| D566,314 S | 4/2008 | Jen | |
| D567,974 S | 4/2008 | Yuen | |
| D583,492 S | 12/2008 | Jen | |
| D620,627 S | 7/2010 | Kovacik et al. | |
| 7,775,686 B2 | 8/2010 | Dalton et al. | |
| 8,529,102 B2 * | 9/2013 | Pickard | F21V 7/0033 362/231 |
| D703,358 S | 4/2014 | Shiu | |
| D709,231 S | 7/2014 | Nguyen | |
| D713,982 S | 9/2014 | Tompkin | |
| 8,851,702 B2 | 10/2014 | Lau | |
| D717,480 S | 11/2014 | Hsu et al. | |
| D717,481 S | 11/2014 | Yong | |
| D726,358 S | 4/2015 | Young | |
| D734,519 S | 7/2015 | Shen | |
| D738,021 S | 9/2015 | Wang | |
| D747,022 S | 1/2016 | Leung | |
| D767,188 S | 9/2016 | Jigamian | |
| D774,229 S | 12/2016 | Prieto | |
| 2004/0057232 A1 * | 3/2004 | Poon | F21L 4/005 362/188 |
| 2009/0135606 A1 * | 5/2009 | Young | F21V 7/0025 362/310 |
| 2015/0009660 A1 * | 1/2015 | Lee | F21L 4/00 362/186 |
| 2016/0061389 A1 * | 3/2016 | Dong | F21V 13/04 362/297 |

\* cited by examiner

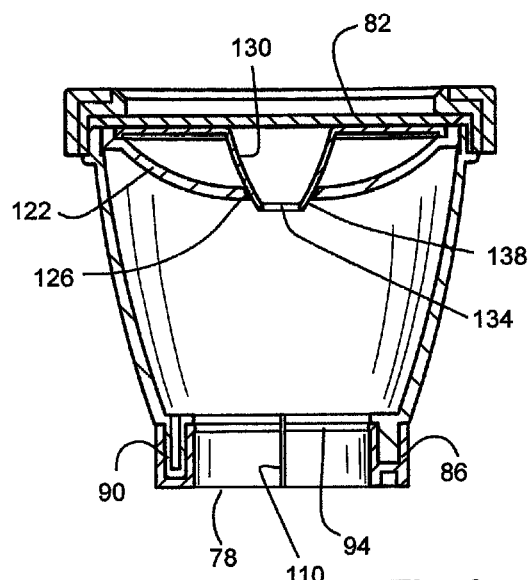
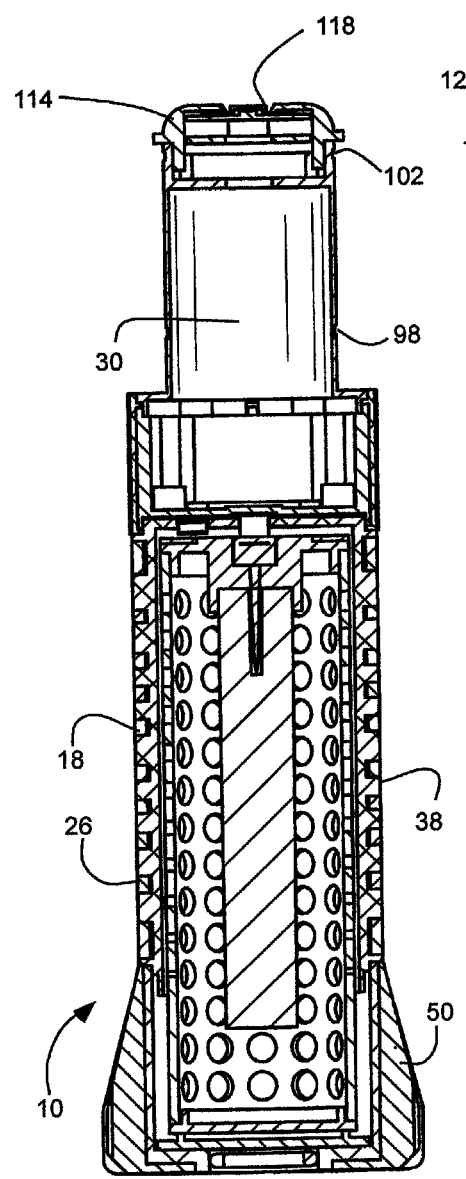
Fig. 6
Fig. 5

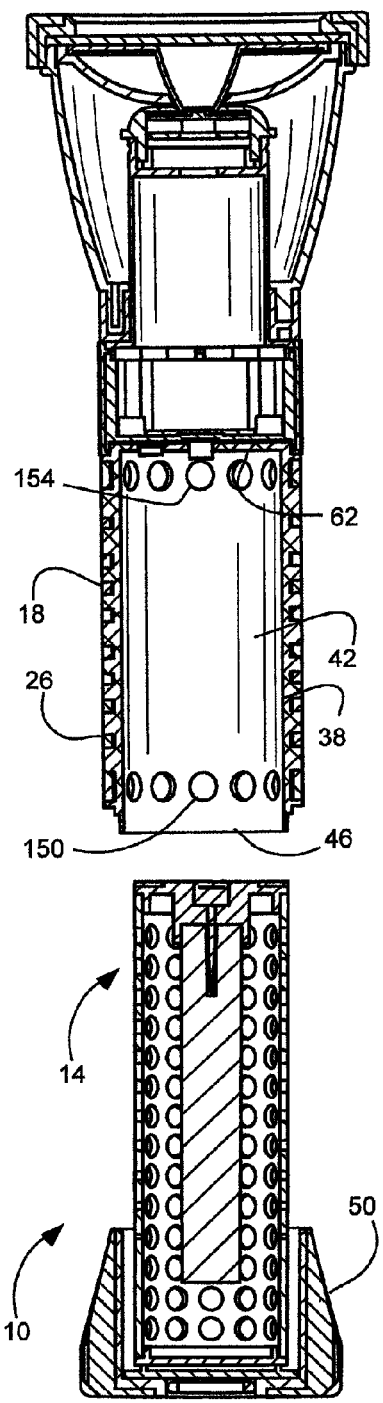
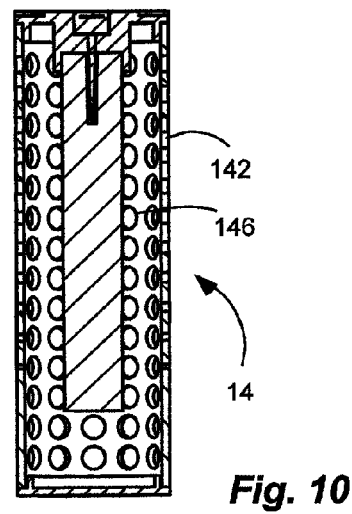
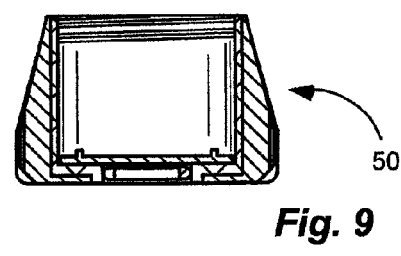
Fig. 8
Fig. 10
Fig. 9

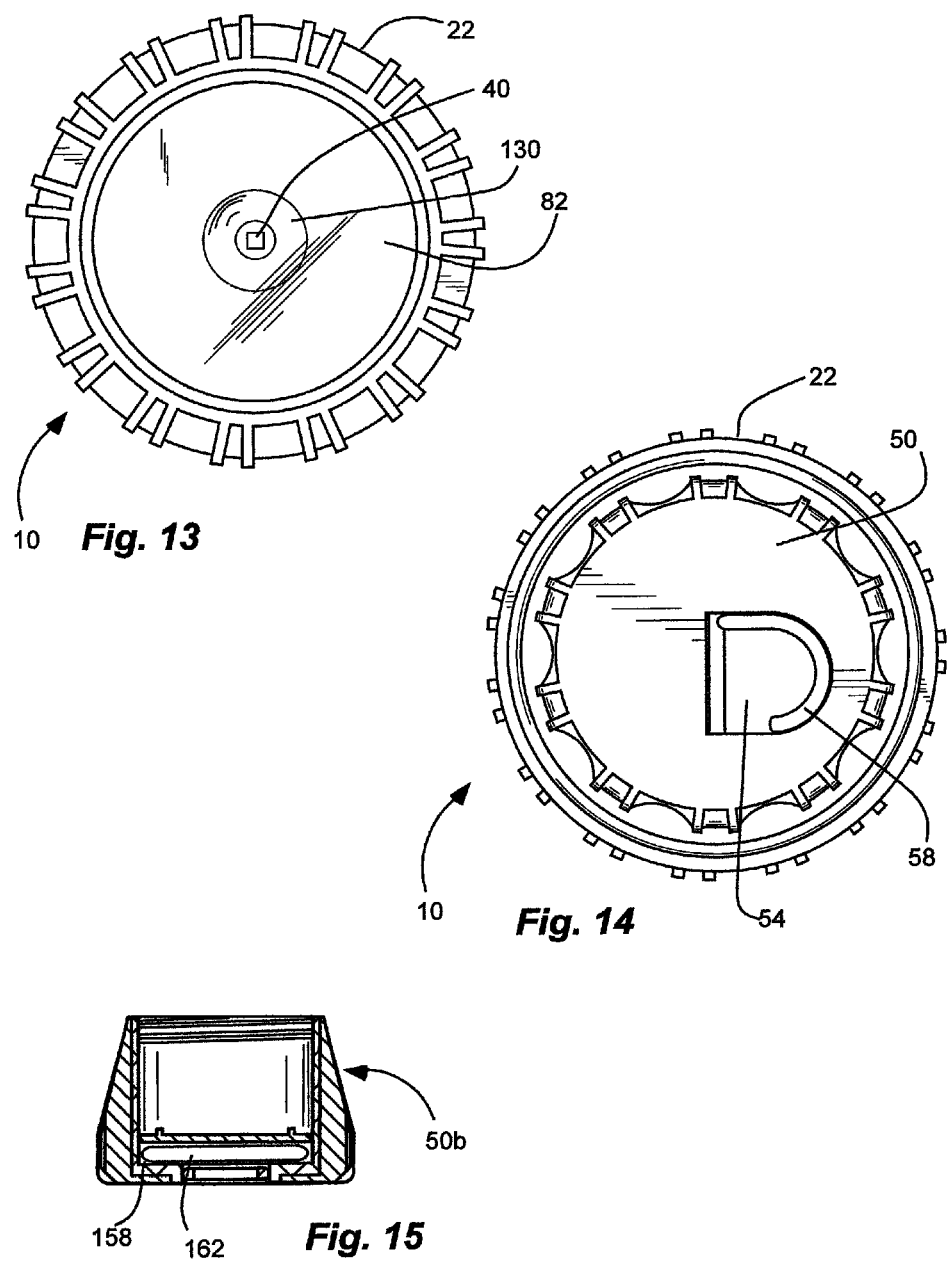

COMBINED FLASHLIGHT AND LANTERN

PRIORITY CLAIM(S)

This is a continuation of U.S. patent application Ser. No. 15/467,408, Filed Mar. 23, 2017; which claims priority to U.S. Provisional Patent Application Ser. No. 62/432,368, filed Dec. 9, 2016; which are hereby incorporated herein by reference.

BACKGROUND

Field of the Invention

The present invention relates generally to a combined flashlight and lantern that can be powered by a metal-air fuel cell (MAFC) that is activated by water or an electrolyte solution, such as salt water.

Related Art

Flashlights usually require batteries that can expire or lose power during storage. In addition, flashlights can be difficult to use in some situations, like hands-free or tabletop configurations. Lanterns can been designed for hands-free or tabletop use, but cannot project beams of light.

SUMMARY OF THE INVENTION

It has been recognized that it would be advantageous to develop a flashlight with a long storage life and that can be used in emergency situations. In addition, it has been recognized that it would be advantageous to develop a flashlight that runs on water, e.g. by adding water or an electrolyte solution, such as salt water, to a metal-air fuel cell (MAFC) of the flashlight. In addition, it has been recognized that it would be advantageous to develop a flashlight that can also function as a lantern.

The invention provides a combined flashlight and lantern device comprising a body with a head and a shank. A column extends from the shank. A proximal convex reflector is disposed on a distal end of the column. A light is disposed on the distal end of the column adjacent the proximal convex reflector. A dimple is formed in the proximal convex reflector and aligned with the light. The head is slidable on the column. The head comprises a sleeve having proximal and distal ends, and a lateral wall with at least a portion that is transparent or translucent defining a lateral lantern lens. A proximal opening is at the proximal end of the sleeve and slidable receives the column therein. A flashlight lens is disposed at a distal end of the sleeve opposite the proximal opening. A distal convex reflector is carried by the sleeve, and opposes the proximal convex reflector of the column, and has an aperture therein aligned with the light. The proximal and distal convex reflectors move towards and away from one another as the head slides on the column. A distal concave reflector is carried by the sleeve and has an aperture therein aligned with the aperture of the distal convex reflector of the sleeve. A projection extends from the distal convex reflector and has the aperture aligned with the light. The projection is receivable in the dimple with the light adjacent the aperture when the head is slid towards the handle.

The head slides between at least two positions, comprising: a retracted position, defining a flashlight configuration; and an extended position, defining a lantern configuration. In the retracted position, and the flashlight configuration, the sleeve is displaced towards the shank, the distal convex reflector of the sleeve is adjacent the proximal convex reflector of the column, and the light is received adjacent the aperture of the distal concave reflector to disperse light reflected off of the distal concave reflector of the sleeve and out of the flashlight lens. In the extended position, and the lantern configuration, the sleeve is displaced away from the shank, the distal and proximal convex reflectors are separated from one another by a gap, and the light is disperse off of the distal and proximal convex reflectors and out of the lateral lantern lens.

In accordance with one embodiment of the invention, the proximal convex reflector or the projection, or both, can be opaque and configured to resist light from the light passing laterally therethrough.

In accordance with another embodiment of the invention, the shank defines a handle and can be longer than the column, and can be wider than the column. In accordance with another embodiment of the invention, the proximal convex reflector and the projection can be specular reflectors.

In accordance with another embodiment of the invention, the handle can have a hollow and an open end. A metal-air fuel cell can be electrically coupled to the light, and removably disposed in the hollow of the handle. A first aperture can be formed at one end of the handle and a second aperture can be formed at an opposite end of the handle to expose the fuel cell to ambient air and vent reaction by-product gases of the metal-air fuel cell when activated.

In accordance with another embodiment of the invention, an annular slide can be carried by the sleeve of the head and disposed around and slidable along the column. The annular slide can have an annular channel receiving the proximal opening of the head. An annular seal can extend from an inner surface of the annular slide, and can abut to the column and can slide along the column as the head slides on the column. A pair of annular grooves can be formed in the column and spaced-apart from one another. The pair of annular grooves can removably receive the annular seal therein. The pair of annular grooves can comprise a proximal groove corresponding to the retracted position of the head with respect to the handle, and a distal groove corresponding to the extended position of the head with respect to the handle. The annular seal defines a detent biasing the head in the retracted and extended positions.

In accordance with another embodiment of the invention, an axial rib can be slidable in an axial groove disposed between the column and the head to resist the head and the shank rotating with respect to one another.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 5 is a cross-sectional side view of a shank of the combined flashlight and lantern of FIG. 1, shown with the head removed;

FIG. 6 is a cross-sectional side view of the head of the combined flashlight and lantern of FIG. 1, shown removed from the shank;

FIG. 8 is a cross-sectional side view of the combined flashlight and lantern of FIG. 1, shown with a cap and a metal-air fuel cell housing removed from the shank;

FIG. 9 is a cross-sectional side view of the cap of the combined flashlight and lantern of FIG. 1;

FIG. 10 is a cross-sectional side view of the metal-air fuel cell housing of the combined flashlight and lantern of FIG. 1;

FIG. 13 is a top view of the combined flashlight and lantern of FIG. 1;

FIG. 14 is a bottom view of the combined flashlight and lantern of FIG. 1; and

FIG. 15 is a cross-sectional side view of another cap for another combined flashlight and lantern in accordance with another embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The term "lens" is used herein broadly to refer to a window through which light is passed. The lens may or may not have optical power and may or may not have curved surfaces. The lens can be transparent or translucent.

Description

As illustrated in FIGS. 1-14, a combined flashlight and lantern, indicated generally at 10, in an example implementation in accordance with the invention is shown. The combined flashlight and lantern can be called a "flantern." In one aspect, the flantern can be configured to "run" (not powered) on water, or an electrolyte solution, such as salt water. The flantern can be configured to utilize a metal-air fuel cell (MAFC) 14 (FIGS. 8 and 10) as a power source. The MAFC 14 can be activated by adding water to the MAFC, e.g. by substantially immersing the MAFC in water. The MAFC 14 is configured to provide power to the flantern 10, and light thereof, when water is introduced into the MAFC. In one aspect, the MAFC 14 can be reusable, and can be re-immersed in water and re-activated multiple times. In one aspect, the MAFC 14 can be configured to provide 100 continuous hours of power to the light (so that the light provides 100 hours of continuous light), and can be re-immersed and re-activated at least three times, each for an addition 100 continuous hours of use. In one aspect, the MAFC 14 can be disposable and replaceable (or replaced by another MAFC). In another aspect, the MAFC 14 can be self-contained, and only require the addition of water, when the MAFC comprises salt impregnated therein. In another aspect, the MAFC 14 can be configured to require the addition of an electrolyte solution such as salt water and/or the further addition of salt to the MAFC.

Figure 1A:
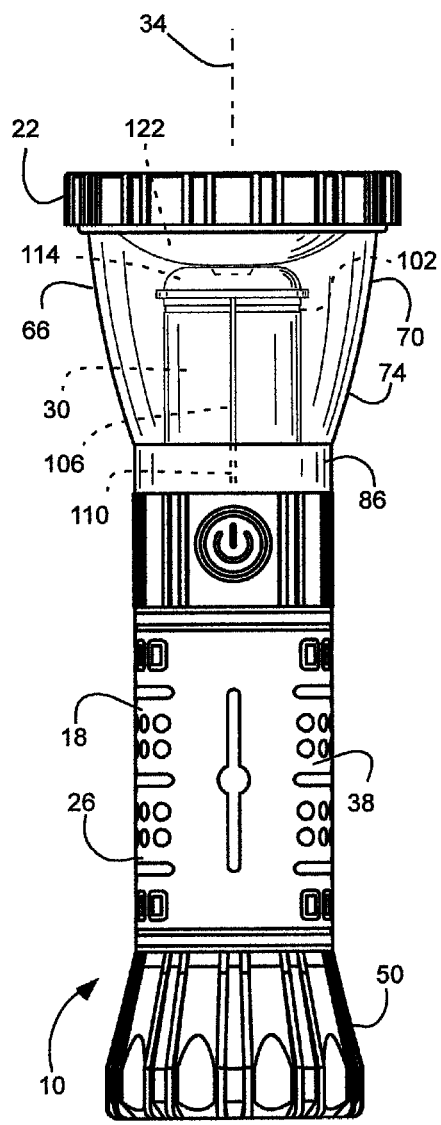
FIG. 1a is a side view of a combined flashlight and lantern in accordance with an embodiment of the invention, shown in a flashlight configuration and with a head in a retracted position.
Figure 1B:
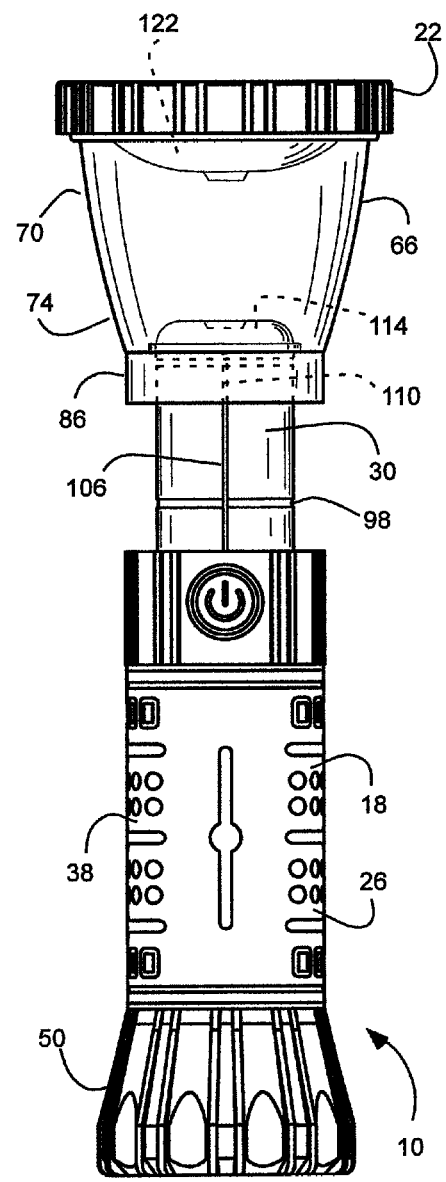
FIG. 1b is a side view of the combined flashlight and lantern of FIG. 1, shown in a lantern configuration and with the head in an extended position.
Figure 2:
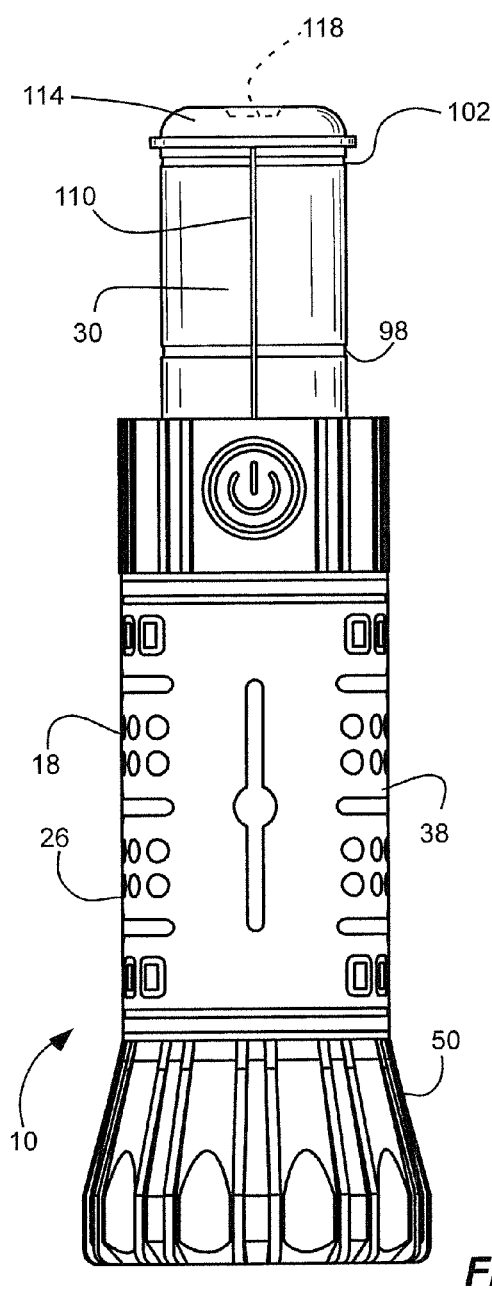
FIG. 2 is a side view of a shank of the combined flashlight and lantern of FIG. 1, shown with the head removed.
Figure 3:
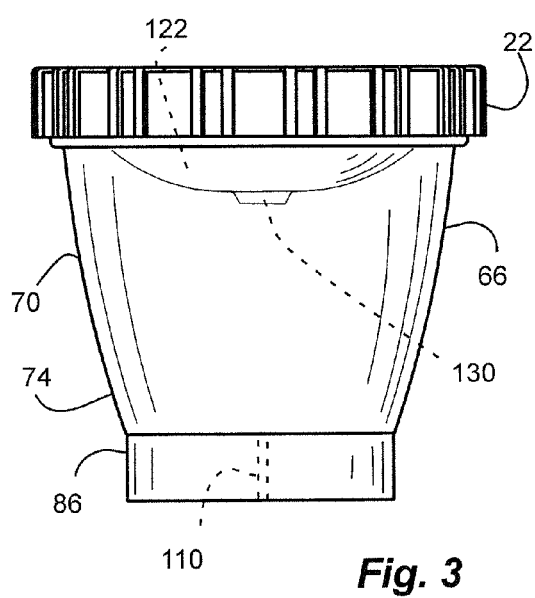
FIG. 3 is a side view of the head of the combined flashlight and lantern of FIG. 1, shown removed from the shank.
Figure 4A:
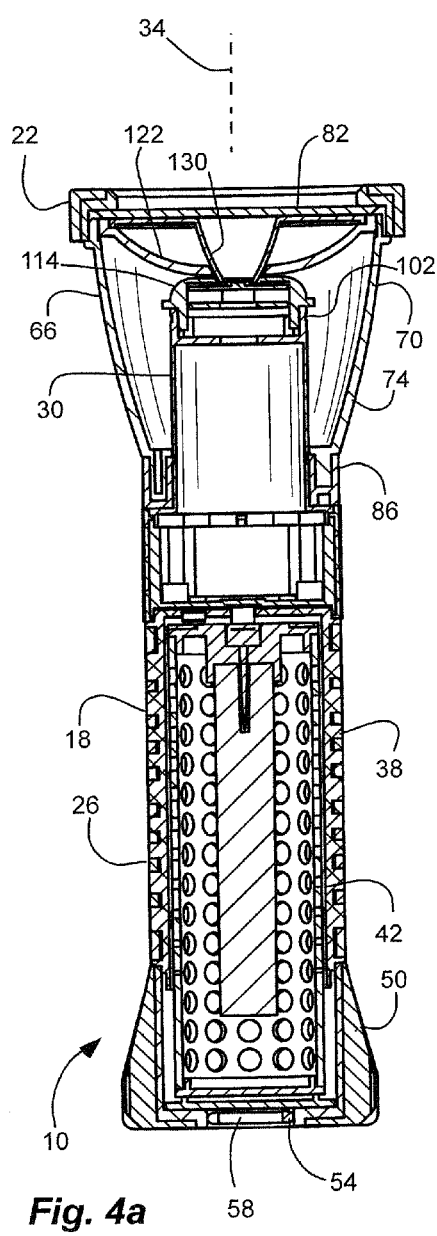
FIG. 4a is a cross-sectional side view of combined flashlight and lantern of FIG. 1, shown in the flashlight configuration and with the head in the retracted position.
Figure 4B:
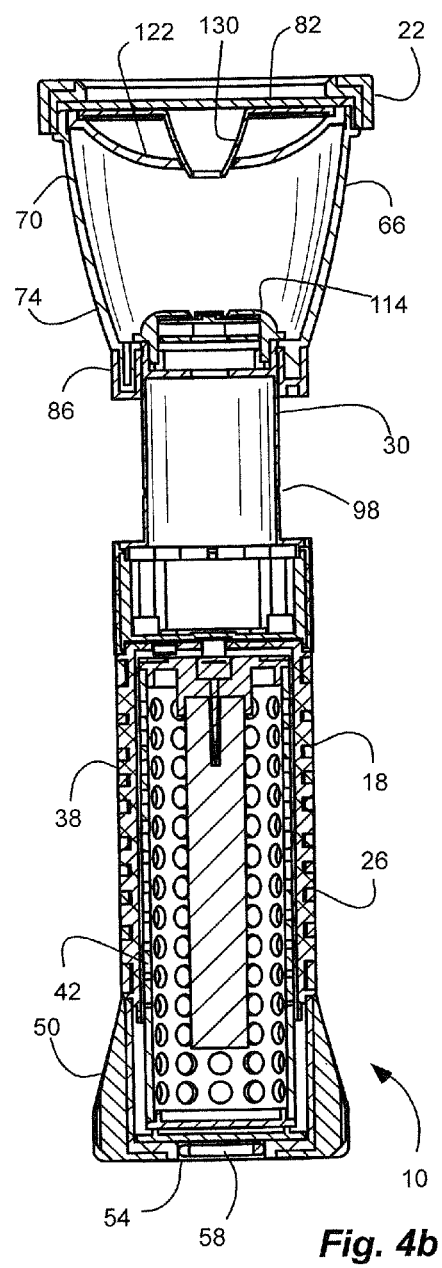
FIG. 4b is a cross-sectional side view of the combined flashlight and lantern of FIG. 1, shown in the lantern configuration and with the head in the extended position.
Figure 7A:
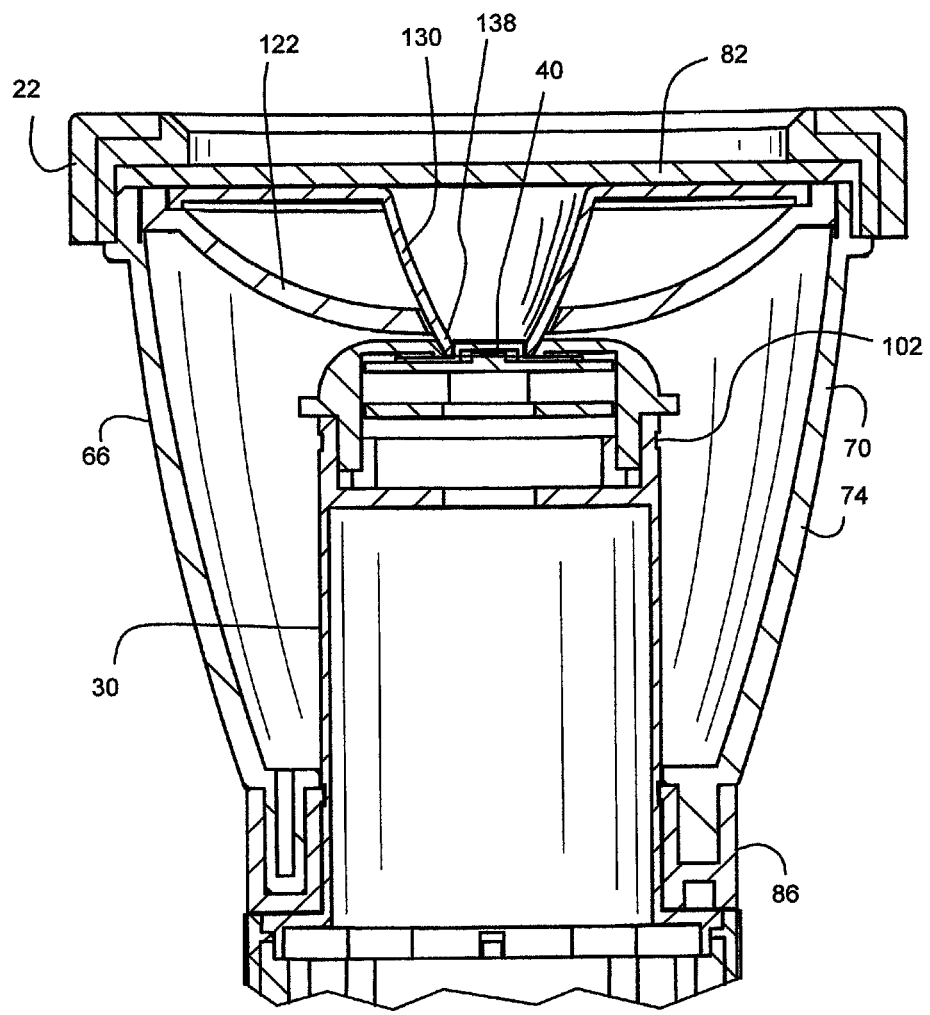
FIG. 7a is a partial detailed cross-sectional side view of the combined flashlight and lantern of FIG. 1, shown the flashlight configuration and with the head in the retracted position.
Figure 7B:
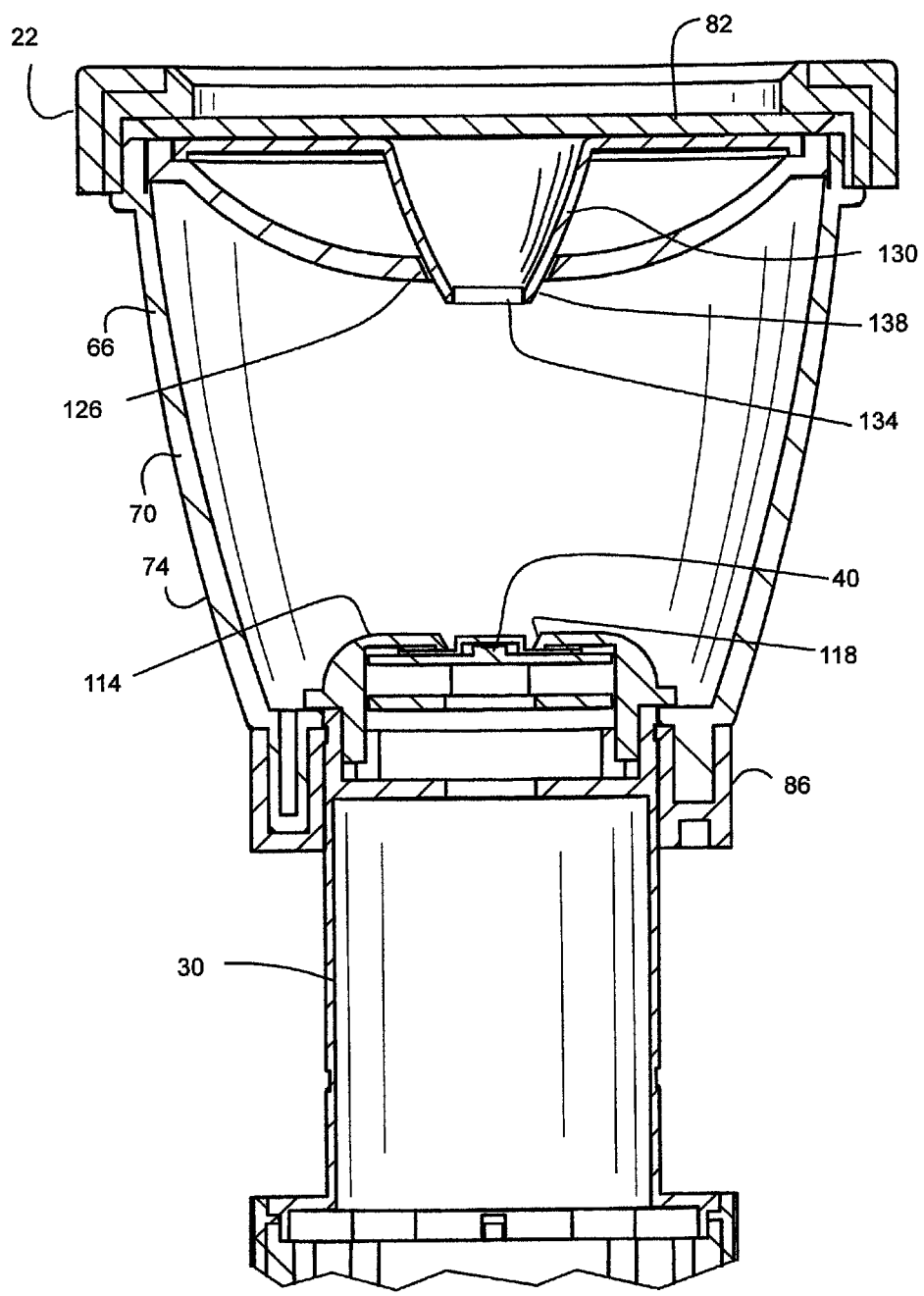
FIG. 7b is a partial detailed cross-sectional side view of the combined flashlight and lantern of FIG. 1, shown the lantern configuration and with the head in the extended position.
Figure 7C:
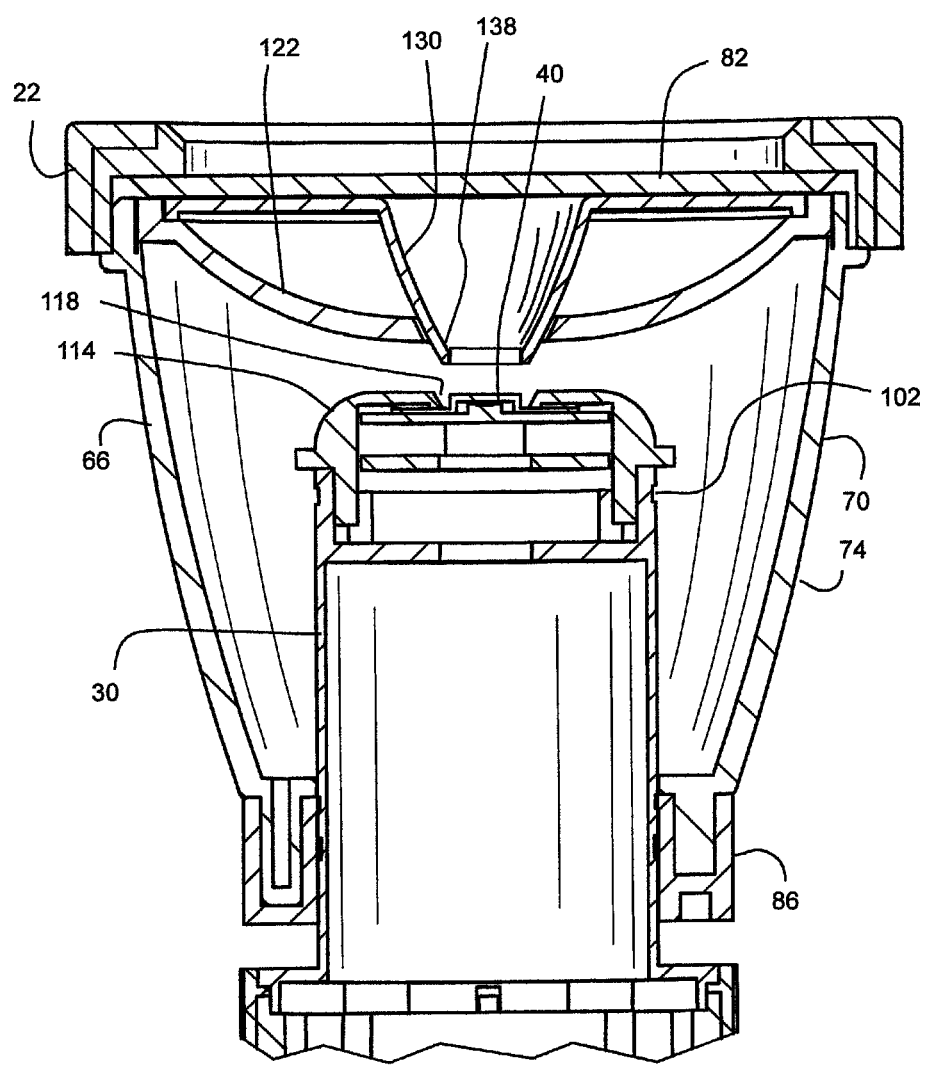
FIG. 7c is a partial detailed cross-sectional side view of the combined flashlight and lantern of FIG. 1, shown transitioning between the flashlight and lantern configuration.
Figure 11:
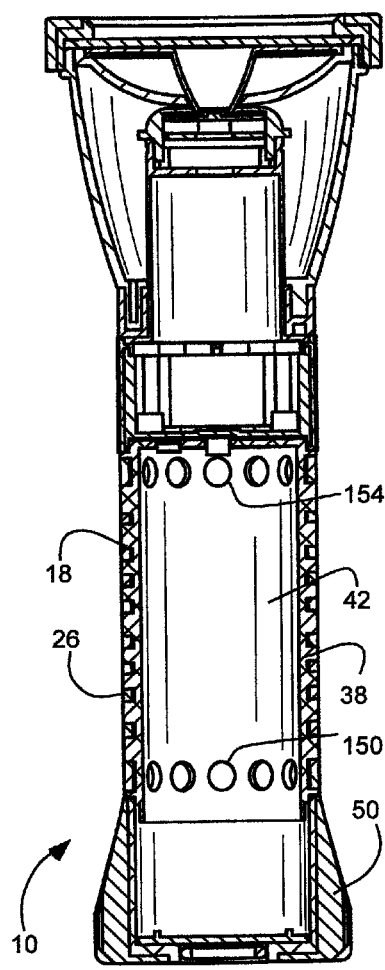
FIG. 11 is a cross-sectional side view of the combined flashlight and lantern of FIG. 1, shown with the metal-air fuel cell removed.
Figure 12:
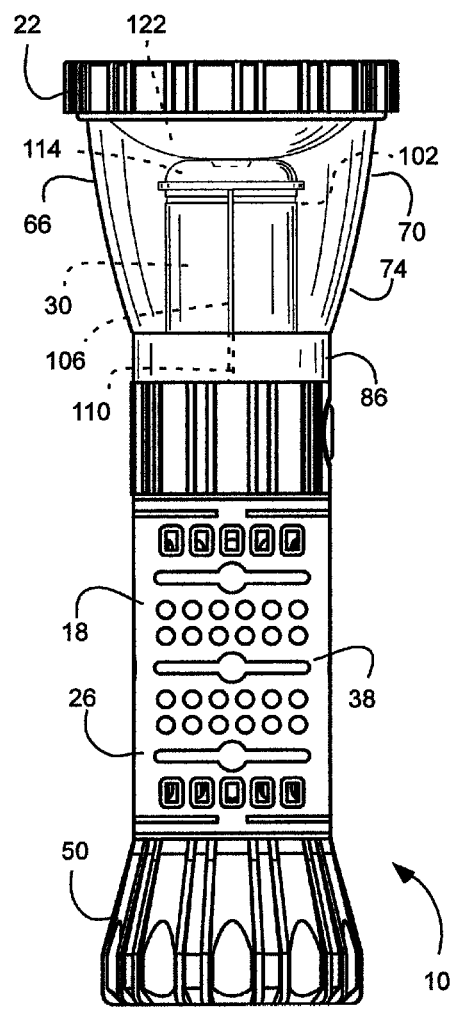
FIG. 12 is a side view of the combined flashlight and lantern of FIG. 1.

In another aspect, the flantern 10 can be configured as a flashlight, as shown in FIGS. 1a, 4a and 7a, and a lantern, as shown in FIGS. 1b, 4b and 7b. In the flashlight configuration, the flantern 10 can direct a more concentrated and/or narrower beam of light axially with respect to the flantern. In addition, the flantern 10 can be held in a user's hand in the flashlight configuration. In the lantern configuration, the flantern 10 can direct light radially with respect to the flantern. In one aspect, the flantern 10 can direct light in a 360 degree circle radially to a longitudinal axis of the flantern, in the lantern configuration. It is understood that the light emanating radially from the flantern can also do so at an incline (acute and/or obtuse) with respect to the longitudinal axis. In addition, the flantern 10 can be disposed on a tabletop or the like, or suspended, in the lantern configuration.

The flantern 10 comprises a body 18 with a head 22 and a shank 26. The head 22 can be movable or slidable with respect to the shank 26, as described below. The shank 26 can have a column 30 extending from the shank. The body 18 and the shank 26 can have a longitudinal axis 34. The shank 26 can define a handle 38 that is sized and shaped to be grasped in a user's hand. The shank 26 can be longer than the column 30, and the shank can wider than the column 30. Thus, the column 30 can be shorter and narrower than the handle 38. The head 22 can slide on the column 30. A light 40 or light element or light source, such as an LED, is disposed on a distal end of the column 30, as best shown in FIG. 7b. The light 40 is electrically coupled to the MAFC 14. In addition, the body and/or the handle or the shank can have a button electrically connected between the light and the MAFC to selectively activate the light.

The shank 26 can be a cylinder, and can be formed by plastic with an over mold. In addition, the shank 26 can have a hollow 42 and an open end 46, as shown in FIG. 8. A cap 50 removably closes the open end 46 of the shank 26. In addition, the cap 50 can have a flat outer end forming a base upon which the flantern 10 can stand. Furthermore, the cap 50 can have a hook cavity 54 with a hook 58 pivotally disposed therein, as shown in FIG. 14, and from which the flantern 10 can be hung or suspended. In one aspect, the head 22 and the cap 50 or base can be enlarged with a greater diameter than the shank 26 or the handle 38. The MAFC 14 is removably disposed in the hollow 42 of the shank 26. The cap 50 is removably coupled to the shank 26 to expose the hollow 42 therein and allow removal and insertion of the MAFC 14. The shank 26 and/or the hollow 42 can have a sealed or closed end 62, opposite the open end 46. The sealed or closed end 62 of the hollow 42 or the shank 26 can comprise a wall and can separate the hollow 42, and the MAFC 14 and water therein, from the light 40 and other electronics or electrical connections, such as the button. Thus, the light, electronics and button are protected from the water, salt and/or electrolyte solution of the MAFC.

As stated above, the head 22 is slidable on the column 30. The head 22 can comprise a sleeve 66 or shroud with proximal and distal ends. The head 22 and/or sleeve 66 has a lateral wall 70 between the proximal and distal ends. In one aspect, the lateral wall 70 has at least a portion that is transparent or translucent, defining a lateral lantern lens 74. In another aspect, the entire lateral wall 70 can be transparent or translucent. In one aspect, the sleeve 66 and/or wall 70 can have a convex profile. The convex profile can be enlarged or can have a greater diameter than the handle 38, and can help a user maintain a grip on the handle or flantern. In addition, the head 22 and the sleeve 66 can have a proximal opening 78 (FIG. 6) at the proximal end of the sleeve that slidable receives the column 30 therein. A flashlight lens 82 is disposed at the distal end of the sleeve 66 and the head 22, opposite the proximal opening 78. In one aspect, the flashlight lens 82 can face axially and can span or cover a distal opening in the sleeve 66. A ring can retain the flashlight lens on the distal opening of the sleeve 66.

An annular slide 86 can be disposed on the proximal end of the sleeve 66, and can be disposed around and slidable along the column 30. The annular slide 86 can have an annular channel 90 receiving the proximal opening 78, and/or end of the lateral wall 70, of the sleeve 66 and the head 22. An annular seal 94 extends from an inner surface of the annular slide 86, and abuts to the column 30, and slides along the column as the head 22 slides on the column. A pair of annular grooves, namely a proximal groove 98 and a distal groove 102, are formed in the column 30, and are spaced-apart from one another. The annular grooves 98 and 102 removably receive the annular seal 94 therein. The proximal groove 98 corresponds to the retracted position of the head 22 with respect to the shank 26 and the handle 38. The distal groove 102 corresponds to the extended position of the head 22 with respect to the shank 26 and the handle 38. The annular seal 94 can define a detent biasing the head 22 in the retracted and extended positions. The annular seal 94 can be formed of a softer, pliable, and resilient material. In addition, the inner surface of the annular seal 94 can form a slide or bearing surface along which the column can slide.

One or more axial ribs 106 and axial grooves 110 can be disposed between the column 30 and the head 22 (or the sleeve 66 or the annular slide 86) to resist the head 22 from rotating with respect to the handle 38 or the shank 26 or the column 30. The axial rib 106 can be slidable in the axial groove 110. In one aspect, the axial rib 106 can extend from the column 30, and the axial groove 110 can extend into the annular slide 86, as shown. In another aspect, the axial rib can extend from the annular slide and the axial groove can extend into the column.

The flantern 10 has multiple reflectors, some movable with respect to one another, to direct, focus and/or disperse light from the light 40. The reflectors can be specular reflectors, with mirror or mirror-like surfaces, to substantially specularly reflect all the light incident on the reflectors. A proximal convex reflector 114 is disposed on the distal end of the column 30, and adjacent the light 40. The proximal convex reflector 114 can be thin/short and squat, with a flatter center and a fillet or curved edge. A dimple 118 (FIG. 7*b*) is formed in the proximal convex reflector 114, and aligned with the light 40. The light 40 can be disposed in the dimple 118, and the dimple 118 and the proximal convex reflector 114 can circumscribe the light 40. A distal convex reflector 122 is carried by the sleeve 66 or the head 22, and opposes the proximal convex reflector 114 of the column 30. The distal convex reflector 122 has an aperture 126 (FIGS. 6 and 7*b*) therein aligned with the light 40. The proximal and distal convex reflectors 114 and 122 move towards and away from one another as the head 22 and the sleeve 66 slides on the column 30. The proximal and distal convex reflectors 114 and 122 can be adjacent, or even abutting, to one another in the retracted position of the head, and the flashlight configuration of the flantern. The proximal and distal convex reflectors 114 and 122 can be spaced-apart from one another and separated by a gap in the extended position of the head, and the lantern configuration of the flantern.

A distal concave reflector 130 is carried by the sleeve 66 and the head 22. The distal concave reflector 130 can be disposed adjacent to, and can face, the flashlight lens 82. In addition, the distal concave reflector 130 can be disposed substantially between the flashlight lens 82 and the distal convex reflector 122. The distal concave reflector 130 has an aperture 134 (FIGS. 6 and 7*b*) therein aligned with the aperture of the distal convex reflector 122 of the sleeve 66, and the light 40. In one aspect, the light 40 can be received at, adjacent and/or in, the aperture 134 of the distal concave reflector 130 in the retracted position of the head 22, and the flashlight configuration of the flantern. A conical projection 138 (FIGS. 6 and 7*b*) can extend from the distal convex reflector 130. The conical projection 138 can extend through the aperture of distal convex reflector 122. Thus, the distal concave reflector 130 can extend through the distal concave reflector 122. In one aspect, the conical projection 138 can form a part of the distal convex reflector 122. The conical projection 138 can be received in the dimple 118, with the light 40 adjacent the aperture when the head 22 is slid towards the handle 38 in the retracted position.

In one of the aspect, one or all of the reflectors 114, 122 and 130 can be opaque such that light from the light 30 does not pass through the reflectors. In another aspect, one or all of the reflectors 114, 122 and 130 can be specular reflectors, such that all light incident thereon is reflected therefrom. For example, at least the proximal convex reflector 114 and/or the conical projection 130 can be opaque, and configured to resist light from the light 40 from passing laterally therethrough. The proximal convex reflector 114 and/or the conical projection 130 can circumscribe and/or radially surround the light 40 in the retracted position. Thus, the proximal convex reflector 114 and/or the conical projection 130 can resist light from the light 40 from passing laterally through the lantern lens 74 in the retracted position of the head 22 and the flashlight configuration of the flantern. Thus, the user can direct light with the flashlight without interference from lateral or radial light being scattered back towards the user's eyes. Each of the distal reflectors 122 and 130 can have outer flanges that can be retained between the sleeve 66, or distal end of the wall 70, and the ring.

As described above, the head 22 slides between at least two position, namely the retracted and extended positions, which correspond to and define at least two configurations of the flantern 10, namely flashlight and lantern configurations, respectively. In the retracted position, and the flashlight configuration, shown in FIGS. 1*a*, 4*a* and 7*a*, the sleeve 66 and the head 22 are displaced towards the shank 26 and the handle 38; the distal convex reflector 122 of the sleeve 66 is adjacent the proximal convex reflector 114 of the column 30, and the light 40 is received adjacent the aperture 134 of the distal concave reflector 130, to disperse light reflected off of the distal concave reflector 130 of the sleeve 66 and out of the flashlight lens 82. As described above, the proximal convex reflector 114 and/or the conical projection 130 can resist light from the light 40 from passing laterally therethrough, or laterally out of the lateral lantern lens 74.

In the extended position, and the lantern configuration, shown in FIGS. 1b, 4b and 7b, the sleeve 66 and the head 22 are displaced away from the shank 26 and the handle 38; the distal and proximal convex reflectors 114 and 122 are separated from one another by a gap, to disperse light from the light 40 off of the distal and proximal convex reflectors 114 and 122, and out of the lateral lantern lens 74. A small amount of light may pass through the aperture 134, and out of the flashlight lens 82, in the lantern configuration. But a majority of the light will emit from the light 40, with some reflecting off of the distal convex reflector 122 and out of the lateral lantern lens 73, and some reflecting off of the distal convex reflector 122, back to the proximal convex reflector 114, and out of the lateral lantern lens 74.

In addition, the column 30 is separate from the handle 38 or the shank 26, and the head 22 slides on the column 30, while a length of the handle 38 remains exposed with respect to the head 22 in both the extended and retracted positions. Thus, a user is able to grasp the handle 38 with one hand, and the head 22 with the other hand, and manipulate or slide the head 22 between the extended and retracted positions, and the lantern and flashlight configurations.

As described above, the light 40 can be powered by a MAFC 14, which can be electrically coupled to the light, and which can be removably disposed in the hollow 42 of the handle 38 and the shank 26. Referring to FIG. 10, the MAFC 14 can be or can comprise a metal-air cell type battery, with a metal anode, an air or oxygen cathode, and/or an electrolyte. The metal anode can be magnesium. Suitable cathodes will be known to those in the art, and can include a cathode comprising a porous sheet, such as a porous carbon sheet allowing air or oxygen from or through the cathode. The MAFC 14 can have a housing 142 with multiple holes 146 to allow water or an electrolyte solution to enter the housing 142, and thus the MAFC. The housing 142 can be a plastic cylinder with a top and a bottom, and a perimeter cylindrical wall that has multiple holes 146 therein. The active components of the MAFC can be disposed in the housing 142. Referring again to FIGS. 1-12, the shank 26 and the handle 38 can have one or more apertures therethrough to expose the MAFC to ambient air/oxygen and/or vent reaction by-product gases of the MAFC when activated. In one aspect, one or more first apertures 150 can be disposed at one end of the handle 38 or shank 26, and one or more second apertures 154 at an opposite end of the handle 38 or shank 26. In addition, the apertures 150 and 154 can be formed in a lateral side of the handle 38 or the shank 26. Thus, MAFC 14 can remain exposed to ambient air despite an orientation of the flantern and/or how it is being held. A cylindrical gap can be formed between an outer surface of a wall of the housing 142 and an inner surface of a wall of the shank 26 and the handle 38 to allow air/oxygen to circulate around the housing and the multiple holes 146 thereof.

In one aspect, the MAFC can comprise salt impregnated therein. The salt can be disposed in the housing 142, and can form an electrolyte solution when water is added into the housing or MAFC. Thus, salt can be disposed in the housing 42 to form an electrolyte when the MAFC is exposed to water. For example, water can be added or poured into the MAFC, or the MAFC can be dipped or immersed into water.

In one aspect, the salt can be disposed on surfaces of the inside of the housing, the anode, and/or the cathode. In addition, the salt can impregnate a fibrous material in the housing. Thus, the MAFC 14 can be self-contained, and can only require the addition of water.

In one aspect, a method for activating and using the flantern 10 as described above comprises withdrawing the MAFC 14 from the shank 26 or the handle 38; activating the MAFC by exposing the MAFC to water or an electrolyte; and reinserting the MAFC 14 into the shank 26 or the handle 38. In one aspect, the MAFC 14 can have slat impregnated therein, and can be exposed to water by substantially immersing the MAFC in water. In another aspect, the MAFC 14 can be exposed to an electrolyte, such as salt water. For example, salt can be added to water to form the electrolyte, and the MAFC can be substantially immersed in the electrolyte. The method can also comprise removing the base 50 from the shank 26 or the handle 38 before withdrawing the MAFC; and replacing the base 50 on the shank 26 or the handle 38 after reinserting the MAFC.

In another aspect, the method for activating and using the flantern 10 as described above comprises activating the MAFC 14 by exposing the flantern 10 itself to water or an electrolyte. For example, the handle 38 or the shank 26 can be substantially immersed in water or an electrolyte with the water or electrolyte entering the hollow 42 and the MAFC 14 through the first and/or second apertures 150 and/or 154 in the shank 26 or the handle 38.

In another aspect, the MAFC can be configured to receive the addition of an electrolyte, such as salt water or salt. As described above, salt can be added to water to form the electrolyte, and the MAFC can be substantially immersed in the electrolyte. Referring to FIG. 15, another cap 50b is shown that is similar in most respects to that described above. The cap 50b includes a compartment 158 carried by the cap, and carrying spare salt 162 for the MAFC 14. The spare salt can be added to the MAFC along with water. In one aspect, the container can be opened and the salt added to a container of water into which the MAFC is immersed.

In one aspect, the MAFC 14 can be carried by and removably coupled to the cap 50 to facilitate handling. The cap 50 can be removed from the shank 26 and the handle 38, carrying with it the MAFC, which can then be dipped or immersed in water while the user holds the cap.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A combined flashlight and lantern device, comprising:
   a) a handle;
   b) a head slidable with respect to the handle and having a flashlight lens on an end opposite the handle and a lateral portion that is translucent or transparent defining a lantern lens;
   c) a light source carried by the handle and surrounded by the head;
   d) a pair of opposing convex reflectors movable toward and away from one another as the head slides with respect to the handle, and the pair of opposing convex reflectors comprising a proximal convex reflector carried by the handle and circumscribing the light source, and a distal convex reflector carried by the head and movable towards and away from the light source as the head slides with respect to the handle;

e) a dimple formed in the proximal convex reflector and aligned with the light source;

f) a distal concave reflector carried by the head adjacent the flashlight lens;

g) the distal concave reflector having a projection with an aperture aligned with the light source, and the projection receivable in the dimple with the light source adjacent the aperture when the head slides towards the handle; and h) the proximal convex reflector or the projection, or both, being opaque and configured to resist light from the light source passing laterally therethrough.

2. The flashlight and lantern device in accordance with claim 1, wherein the proximal convex reflector and the projection are specular reflectors.

3. The flashlight and lantern device in accordance with claim 1, further comprising:

the head being slidable with respect to the handle between at least two positions, comprising:

i) a retracted position, defining a flashlight configuration, in which the projection is received within the dimple and the aperture is adjacent the light source configured to direct light from the light source through the distal concave reflector and out the flashlight lens; and ii) an extended position, defining a lantern configuration, in which the pair of opposing convex reflectors is spaced-apart from one another by a gap, and configured to reflect light mostly from the pair of opposing convex reflectors and through the lantern lens.

4. The flashlight and lantern device in accordance with claim 1, further comprising:

a) a column extending from the handle;

b) the head having a proximal opening receiving the column;

c) an annular slide disposed around and slidable along the column, and having an annular channel receiving the proximal opening of the head;

d) an annular seal extending from an inner surface of the annular slide and abutting to the column and sliding along the column as the head slides on the column;

e) a pair of annular grooves formed in the column and spaced-apart from one another and removably receiving the annular seal therein, the pair of annular grooves comprising a proximal groove corresponding to a retracted position of the head with respect to the handle, and a distal groove corresponding to an extended position of the head with respect to the handle; and f) the annular seal defining a detent biasing the head in the retracted and extended positions.

5. The flashlight and lantern device in accordance with claim 1, further comprising:

a) the handle having a shank defining the handle and a column extending from the shank;

b) the head being slidably disposed on the column;

c) the shank being longer than the column; and d) the shank being wider than the column.

6. The flashlight and lantern device in accordance with claim 1, further comprising:

a) the handle having a shank defining the handle and a column extending from the shank;

b) the head being slidably disposed on the column; and c) an axial rib slidable in an axial groove disposed between the column and the head to resist the head and the shank from rotating with respect to one another.

7. The flashlight and lantern device in accordance with claim 1, wherein the head further comprises a sleeve with a convex profile that is transparent or translucent and forms the lateral lens.

8. The flashlight and lantern device in accordance with claim 1, further comprising:

a) the handle having a hollow and an open end;

b) a metal-air fuel cell electrically coupled to the light source and removably disposed in the hollow of the handle;

c) a cap removably closing the open end of the handle; and d) a compartment carried by the cap and carrying spare salt for the metal-air fuel cell.

9. The flashlight and lantern device in accordance with claim 1, further comprising:

a) the handle having a hollow;

b) a metal-air fuel cell electrically coupled to the light source and removably disposed in the hollow of the handle; and c) an aperture formed in a lateral side of the handle and exposing the metal-air fuel cell to ambient air and venting reaction by-product gases of the metal-air fuel cell when activated.

10. The flashlight and lantern device in accordance with claim 9, wherein the aperture in the handle further comprises a first aperture at one end of the handle and a second aperture at an opposite end of the handle.

11. A combined flashlight and lantern device, comprising:

a) a body with a head and a shank;

b) a column extending from the shank;

c) the shank defining a handle and being longer than the column, and the shank being wider than the column;

d) a proximal convex reflector disposed on a distal end of the column;

e) a light source disposed on the distal end of the column adjacent the proximal convex reflector;

f) the head slidable on the column, the head comprising:

i) a sleeve having proximal and distal ends, and a lateral wall with at least a portion that is transparent or translucent defining a lateral lantern lens;

ii) a proximal opening at the proximal end of the sleeve slidable receiving the column therein;

iii) a flashlight lens disposed at a distal end of the sleeve opposite the proximal opening;

iv) a distal convex reflector carried by the sleeve, and opposing the proximal convex reflector of the column, and having an aperture therein aligned with the light source; and v) a distal concave reflector carried by the sleeve and having an aperture therein aligned with the aperture of the distal convex reflector of the sleeve; and g) the head sliding between at least two positions, comprising:

i) a retracted position, defining a flashlight configuration, in which the sleeve is displaced towards the shank, the distal convex reflector of the sleeve is adjacent the proximal convex reflector of the column, and the light source is received adjacent the aperture of the distal concave reflector and configured to disperse light reflected off of the distal concave reflector of the sleeve and out of the flashlight lens; and ii) an extended position, defining a lantern configuration, in which the sleeve is displaced away from the shank, the distal and proximal convex reflectors are separated from one another by a gap, and the light source is configured to disperse light off of the distal and proximal convex reflectors and out of the lateral lantern lens.

12. The flashlight and lantern device in accordance with claim 11, wherein the column is separate from the handle and the head slides on the column while a length of the handle remains exposed with respect to the head in both the extended and retracted positions.

13. The flashlight and lantern device in accordance with claim 11, further comprising:
   a) a dimple formed in the proximal convex reflector and aligned with the light source;
   b) a conical projection extending from the distal concave reflector and receivable in the dimple with the light source adjacent the aperture thereof when the head slides towards the handle in the retracted position; and
   c) the proximal convex reflector or the conical projection, or both, being opaque configured to resist light from the light source from passing therethrough.

14. The flashlight and lantern device in accordance with claim 11, further comprising:
   a) an annular slide disposed around and slidable along the column, and having an annular channel receiving the proximal opening of the head;
   b) an annular seal extending from an inner surface of the annular slide and abutting to the column and sliding along the column as the head slides on the column;
   c) a pair of annular grooves formed in the column and spaced-apart from one another and removably receiving the annular seal therein, the pair of annular grooves comprising a proximal groove corresponding to the retracted position of the head with respect to the handle, and a distal groove corresponding to the extended position of the head with respect to the handle; and
   d) the annular seal defining a detent biasing the head in the retracted and extended positions.

15. The flashlight and lantern device in accordance with claim 11, further comprising:
   a) the head being slidably disposed on the column; and
   b) an axial rib slidable in an axial groove disposed between the column and the head to resist the head and the shank rotating with respect to one another.

16. The flashlight and lantern device in accordance with claim 11, wherein the sleeve has a convex profile and is transparent or translucent and forms the lateral lens.

17. The flashlight and lantern device in accordance with claim 11, further comprising:
   a) the shank having a hollow and an open end;
   b) a metal-air fuel cell electrically coupled to the light source and removably disposed in the hollow of the shank;
   c) a cap removably closing the open end of the shank; and
   d) a compartment carried by the cap and carrying spare salt for the metal-air fuel cell.

18. The flashlight and lantern device in accordance with claim 11, further comprising:
   a) the shank having a hollow;
   b) a metal-air fuel cell electrically coupled to the light source and removably disposed in the hollow of the shank; and
   c) an aperture formed in a lateral side of the handle and exposing the metal-air fuel cell to ambient air and venting reaction by-product gases of the metal-air fuel cell when activated.

19. The flashlight and lantern device in accordance with claim 18, wherein the aperture in the shank further comprises a first aperture at one end of the shank and a second aperture at an opposite end of the shank.

20. A combined flashlight and lantern device, comprising:
   a) a body with a head and a shank;
   b) a column extending from the shank;
   c) the shank defining a handle and being longer than the column, and the shank being wider than the column;
   d) a proximal convex reflector disposed on a distal end of the column;
   e) a light source disposed on the distal end of the column adjacent the proximal convex reflector;
   f) a dimple formed in the proximal convex reflector and aligned with the light source;
   g) the head slidable on the column, the head comprising:
      i) a sleeve having proximal and distal ends, and a lateral wall with at least a portion that is transparent or translucent defining a lateral lantern lens;
      ii) a proximal opening at the proximal end of the sleeve slidable receiving the column therein;
      iii) a flashlight lens disposed at a distal end of the sleeve opposite the proximal opening;
      iv) a distal convex reflector carried by the sleeve, and opposing the proximal convex reflector of the column, and having an aperture therein aligned with the light source; and
      v) the proximal and distal convex reflectors moving towards and away from one another as the head slides on the column; and
      vi) a distal concave reflector carried by the sleeve and having an aperture therein aligned with the aperture of the distal convex reflector of the sleeve;
   h) a conical projection extending from the distal convex reflector and having the aperture aligned with the light source, and the conical projection receivable in the dimple with the light source adjacent the aperture when the head is slid towards the handle;
   i) the proximal convex reflector or the conical projection, or both, being opaque and configured to resist light from the light source from passing therethrough;
   j) the head sliding between at least two positions, comprising:
      i) a retracted position, defining a flashlight configuration, in which the sleeve is displaced towards the shank, the distal convex reflector of the sleeve is adjacent the proximal convex reflector of the column, and the light source is received adjacent the aperture of the distal concave reflector and configured to disperse light reflected off of the distal concave reflector of the sleeve and out of the flashlight lens; and
      ii) an extended position, defining a lantern configuration, in which the sleeve is displaced away from the shank, the distal and proximal convex reflectors are separated from one another by a gap, and the light source is configured to disperse light off of the distal and proximal convex reflectors and out of the lateral lantern lens;
   k) the proximal convex reflector and the conical projection are specular reflectors;
   l) the handle having a hollow and an open end;
   m) a cap removably closing the open end of the handle n) a metal-air fuel cell electrically coupled to the light source and removably disposed in the hollow of the handle;
o) a first aperture at one end of the handle and a second aperture at an opposite end of the handle exposing the metal-air fuel cell to ambient air and venting reaction by-product gases of the metal-air fuel cell when activated;
p) an annular slide carried by the sleeve of the head and disposed around and slidable along the column, and having an annular channel receiving the proximal opening of the head;
q) an annular seal extending from an inner surface of the annular slide and abutting to the column and sliding along the column as the head slides on the column;
r) a pair of annular grooves formed in the column and spaced-apart from one another and removably receiving the annular seal therein, the pair of annular grooves comprising a proximal groove corresponding to the retracted position of the head with respect to the handle, and a distal groove corresponding to the extended position of the head with respect to the handle;
s) the annular seal defining a detent biasing the head in the retracted and extended positions; and
t) an axial rib slidable in an axial groove disposed between the column and the head to resist the head and the shank rotating with respect to one another.

* * * * *